July 7, 1936. J. DENARO 2,046,729
EDIBLE CONTAINER
Filed Nov. 28, 1933
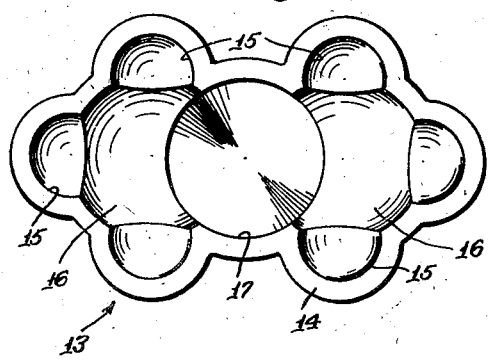
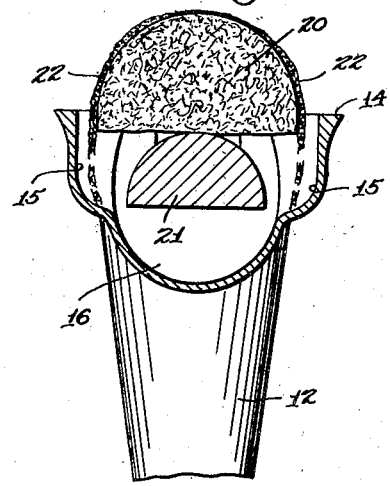
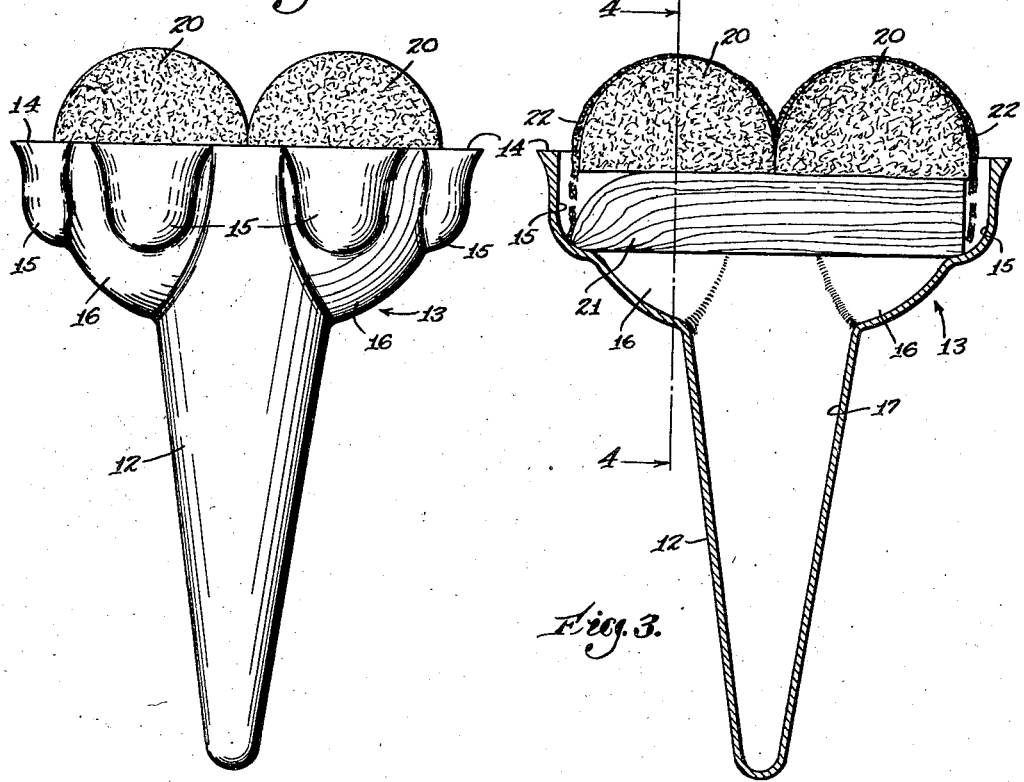
Inventor
James Denaro
by Harold E. Cole
Attorney Patented July 7, 1936

2,046,729

UNITED STATES PATENT OFFICE 2,046,729

EDIBLE CONTAINER

James Denaro, Cambridge, Mass.

Application November 28, 1933, Serial No. 700,036

2 Claims. (Cl. 99—89)

This invention relates to edible containers, and more especially to a pastry receptacle to receive ice cream, confections, fruits and other tasty foods.

The pastry containers now on the market, the most common of which are ice cream cones, are unsuited to receive and hold banana splits, college ices and other tasty confections or desserts which have a liquid, such as syrup, poured over them, although such desserts are becoming more and more popular with people of small means. If syrup or other delectable liquid were poured over the ice cream in an ice cream cone or other edible container, considerable syrup would run down the outside surface of the cone, because there is no other place for it to escape.

One object of my invention is to provide a pastry container which will receive ice cream and can be eaten with the ice cream, which has provision to keep syrup or liquid within the receptacle, so that my container may be used to hold a bana split, college ice, and other desserts which have liquids poured over them. Inasmuch as the container is eaten along with its contents the washing of dishes is dispensed with, and one can enjoy the delights of a banana split while continuing his journey, instead of having to remain in one place.

The foregoing and other objects which will appear as the nature of the invention is better understood, may be accomplished by a container such as is disclosed by the drawing. The nature of the invention is such as to render it susceptible to various changes and modifications, and, therefore, I am not to be limited to the construction disclosed by the drawing; but am entitled to all such changes therefrom as fall within the scope of my claims.

In the drawing:

Figure 1 is a plan view of my edible container.

Figure 2 is a side elevation of my container with ice cream in it.

Figure 3 is a longitudinal section of my container showing the ice cream and banana in it.

Figure 4 is a cross section on the line 4—4 of Figure 3.

As illustrated, my container, which is usually made of the same material as an ice cream cone, preferably has a hollow handle 12 for convenience in holding it, joined to which handle is a hollow receptacle or cup 13. The sides of said receptacle 13 terminate in a top ledge, chime or border 14 which enclose the main cavity or receiving portion 16 in which the ice cream, banana or other confections, fruits or fillers rest. Said cavity, as shown, is of such size as to receive two scoops of ice cream of the usual commercial size. Protruding beyond said main cavity 16 are hollow pockets 15, there being shown two on each side and one at each end. Inasmuch as these pockets 15 are extensions which are smaller than the portion of the main cavity 16 from which they extend, and the balls of ice cream 20, which are of a commercial size, fit within the main cavity 16, when syrup 22 is poured over the ice cream it runs down and enters into said pockets 15, as illustrated in Figures 3 and 4 of the drawing, and may pass into the cavity or hollow portion 17 of the handle, where it will ultimately be consumed as my container is gradually eaten. If it were not for these pockets 15, syrup could not be poured over the ice cream, as it would run down the outside of the edible container and soil the hands. Consequently it is this feature which has made it possible to utilize edible containers for college ices and other popular ices, thereby making them more attractive to more people.

What I claim is:

1. An ice cream cone of edible material having an oblong-like main cavity comprising two portions each adapted to receive a scoop of ice cream, and a constricted portion between and connecting them together, said two portions each having an outwardly projecting pocket at the extreme end of said cone and two outwardly projecting pockets on each side of said two portions.

2. An ice cream cone of edible material having a main cavity comprising two portions each adapted to receive a scoop of ice cream, and a constricted portion between and connecting them together, said two portions each having outwardly projecting pockets spaced apart with restricted portions between and spacing said pockets from each other.

JAMES DENARO.